United States Patent Office 3,380,267
Patented Apr. 30, 1968

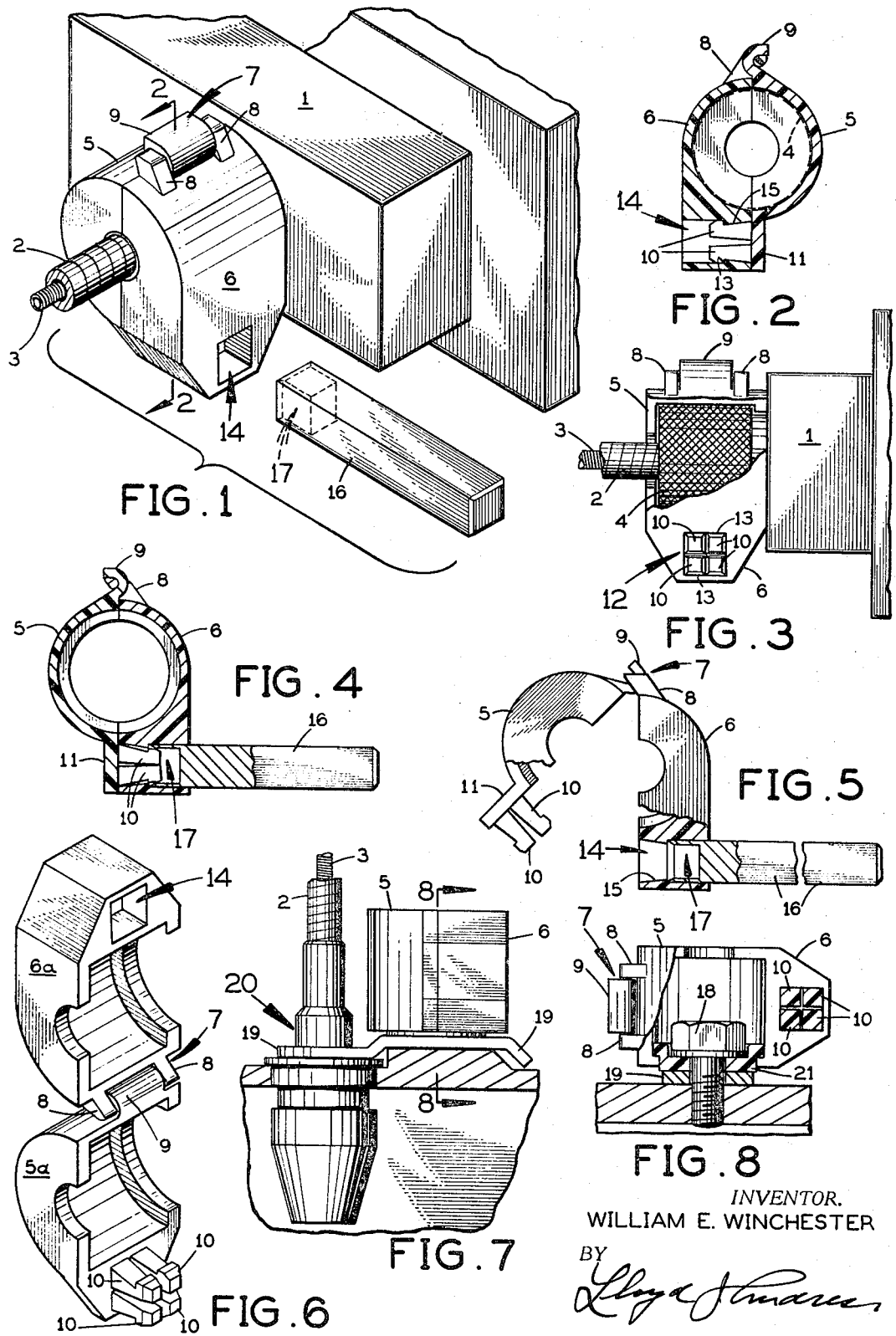

3,380,267
SEALING DEVICE FOR VEHICLE
SPEEDOMETERS
William E. Winchester, 6375 SW. 42nd St.,
Miami, Fla. 33155
Filed Feb. 28, 1966, Ser. No. 530,490
5 Claims. (Cl. 70—232)

ABSTRACT OF THE DISCLOSURE

A sealing device including a hollow housing for enclosing and sealing a cable. The housing is formed of two parts which are hinged at one end and are provided with an interfitting lock at the other end opposite the hinge. The lock is formed by a cavity in one of the halves and a projection on the other half which flexibly interfits in the cavity.

---

This invention relates in general to speedometers and odometers for vehicles and more particularly to a tamperproof means for preventing the unauthorized removal of the speedometer drive cable connections from the transmission drive means.

Prior to this invention, it has been common practice for the odometer readings in conventional speedometers to be re-set by counter rotation of the drive by the simple disconnection of the speedometer cable from either the speedometer or the transmission drive means. This same disconnection permits unauthorized driving of the vehicle without indication on the odometer.

The present invention includes a provision of a low cost sealing device which may be conveniently attached to existing speedometer cable connections, which prevents the unauthorized removal of the cable, which construction is a principal object of the invention.

A further object of the invention is the provision of a hinged body for enclosing the speedometer drive cable when enclosing the connection thereto including a self-locking and sealing means for retaining the body around the cable connection.

A further object of the invention is the provision of a sealing enclosure for enclosing the connections of a speedometer-odometer cable to both the speedometer and the transmission drive means therefor including an integral latch for normally holding the housing in locked position including a special tool means for unlocking and removing said sealing enclosure by authorized persons.

These and other objects and advantages in one embodiment of the invention are shown and described in the following specification and drawing, in which:

FIG. 1 is a fragmentary perspective rear view of a speedometer-odometer with the sealing housing enclosing the cable connection thereto in locked position.

FIG. 2 is a cross sectional view taken through section line 2—2, FIG. 1.

FIG. 3 is a side view of the elements shown in FIG. 1 with a portion broken away.

FIG. 4 is the same as that shown in FIGS. 1 and 2 with the unlocking element engaged.

FIG. 5 shows elements shown in FIGS. 1 and 2 in unlocked open position.

FIG. 6 is a perspective view of a sealing housing for the transmission end of a speedometer cable in open unlocked position.

FIG. 7 is a fragmentary view of the transmission end of a speedometer cable with the sealing housing thereon in locked position.

FIG. 8 is a fragmentary cross sectional view taken through section line 8—8, FIG. 7.

FIG. 1 illustrates a rear view of a typical speedometer-odometer 1 to which is coupled a conventional flexible cable assembly 2 in which a flexible shaft 3 is retained for rotation. The cable and shaft assembly are ordinarily secured to the speedometer 1 by means of a knurled collar nut 4, as illustrated in FIG. 3.

In order to prevent unauthorized removal and replacement of the cable 2 from the speedometer by means of the threaded collar nut, a plastic sealing housing is provided comprising two hollow major parts 5 and 6 which are hinged along one side thereof by an integral hinge means 7, better shown in FIG. 2, in which a pin portion 8 of hinge means 7 is integral with housing part 6 and a hook portion 9 of the hinge is integral with the housing 5, as shown in FIG. 2.

Referring to FIGS. 2 and 3, a locking projection 10 is integral with an offset 11, also integral with housing part 5. It is to be noted from FIG. 3 that the projection 10 is provided with intersecting slots 12 which provide four portions for flexible contraction of the projection 10.

Again referring to FIG. 2, the projection 10 is provided with a latch land 13 on the four sides thereof.

The housing part 6 is provided with a rectangular cavity 14 therethrough in exact alignment with projection 10 when both housing parts are in locked position. Four inward latching projections 15 project inward in cavity 14 for engaging and holding the land 13 when the housing is in closed locking position.

It is to be noted that the outer edges of projection 10 are chamfered for reasons to be hereinafter described.

Referring to FIGS. 1, 2, and 4, a key or an unlocking tool 16 is rectangular in shape and adapted to slidably enter cavity 14 and is provided with a rectangular opening 17 in the end thereof whereby when inserted in cavity 14 it will engage the chamfered edges of projection 10 and contract the four portions thereof permitting the disengagement of lands 13 from projections 15, thus permitting the opening of the sealing housing, as shown in FIG. 5, and permitting the removal and replacement of the cable 2 from and to the speedometer 1.

FIGS. 6, 7, and 8 illustrate an alternate construction for sealing the cap screw or nut 18 normally used for holding a plate 19 for holding the drive end 20 of cable 2 in the transmission for rotation thereby. The alternate members 5a and 6a, although different in shape than their equivalents shown in FIG. 1, serve the identical purpose by the provision of a collar 21 under the nut 18 around which is clamped housing parts 5 and 6a in the same manner as shown in FIG. 1.

It is apparent that when the tool 16 is inserted in the cavity 14 of housing part 6a, it will likewise contract the four portions of projection 10 and permit the removal of the seal for access to the nut or cap screw 18.

It is understood that certain modifications in the construction, utilizing the features above described, are intended to come within the scope of the appended claims.

Having described my invention, I claim:

1. A sealing device for sealing the coupling of a speedometer-odometer cable at a junction thereof comprising a hollow housing means for engaging and enclosing and sealing said coupling coaxial therewith, said housing means comprising two halves adapted to be engaged in a plane intersecting the principal axis of said coupling, said halves comprising integral parts, hinge means secured at one side of said halves for pivotally securing the latter for relative movement, one of said halves having a rectangular cavity therein at a side opposite said hinge means and transverse said axis, a latch shoulder within said cavity positioned for engaging latching projections, at least one flexible latch projection extending in rectangular formation from said other half of said housing positioned to enter said cavity and flex into engagement with said latch shoulder when said housing is closed about said coupling.

2. The construction recited in claim 1 wherein said hinge means comprises a pin means integral with one of said halves and a hook means integral with said other half for engagement with said pin means for pivotally retaining both of said halves for engaging the latter around said coupling.

3. The construction recited in claim 1 including a key having a cavity in one end for slidable insertion in said lock cavity with the end thereof having a pocket therein for engaging and unlatching said latching projection from said latch means when said key is inserted in said cavity for removing said housing means from said coupling.

4. A sealing device for sealing the coupling of a speedometer-odometer cable at a junction thereof comprising a hollow housing means for engaging and enclosing and sealing said coupling coaxial therewith, said housing means comprising two halves adapted to be engaged in a plane intersecting the principal axis of said coupling, hinge means secured at one side of said halves for pivotally securing the latter for relative movement, one of said halves having a rectangular cavity therein at a side opposite said hinge means and transverse said axis, a latch shoulder within said cavity positioned for engaging latching projections, four flexible latch projections extending in rectangular formation from said other halves of said housing positioned to enter said cavity and flex into engagement with said latch shoulder when said housing is closed about said coupling.

5. The construction recited in claim 4 including a rectangular key dimensioned for slidable insertion in said cavity with said key having a rectangular pocket in the end thereof for engaging said four projections and flexing same into unlatched position for opening and removing said housing from said coupling.

References Cited

UNITED STATES PATENTS

| | | | |
|---|---|---|---|
| 779,032 | 1/1905 | Draudt | 292—307 |
| 804,387 | 11/1905 | Davis | 70—57 |
| 1,590,337 | 6/1926 | Witte | 24—110 |
| 3,284,121 | 11/1966 | Lyon | 292—307 |
| 3,327,496 | 6/1967 | De Fusco | 292—307 |

MARVIN A. CHAMPION, *Primary Examiner.*

EDWARD J. McCARTHY, *Assistant Examiner.*